United States Patent [19]

Ito et al.

[11] Patent Number: 5,065,709
[45] Date of Patent: Nov. 19, 1991

[54] VALVE OPERATING SYSTEM FOR INTERNAL COMBUSTION ENGINE

[75] Inventors: Yasutoshi Ito; Toshihiro Kamiyama; Fuminori Kawashima, all of Saitama, Japan

[73] Assignee: Honda Giken Koyo Kabushiki Kaisha, Tokyo, Japan

[21] Appl. No.: 548,123

[22] Filed: Jul. 5, 1990

[30] Foreign Application Priority Data

Jul. 6, 1989 [JP] Japan .............................. 1-79660[U]

[51] Int. Cl.⁵ .............................................. F01L 1/34
[52] U.S. Cl. .............................. 123/90.15; 123/90.16; 123/90.31
[58] Field of Search ................ 123/90.15, 90.16, 90.31

[56] References Cited

U.S. PATENT DOCUMENTS

| | | | |
|---|---|---|---|
| 3,888,217 | 6/1975 | Hisserich | 123/90.31 |
| 4,484,543 | 11/1984 | Maxey | 123/90.15 |
| 4,576,127 | 3/1986 | Doi et al. | 123/90.15 |
| 4,685,429 | 8/1987 | Oyaizu | 123/90.15 |
| 4,726,331 | 2/1988 | Oyaizu | 123/90.15 |
| 4,744,338 | 5/1988 | Sapienza, IV | 123/90.15 |
| 4,768,475 | 9/1988 | Ikemura | 123/90.16 |
| 4,844,023 | 7/1989 | Konno et al. | 123/90.16 |
| 4,889,087 | 12/1989 | Bergsten | 123/90.31 |

FOREIGN PATENT DOCUMENTS 0317372  5/1989  European Pat. Off. .
0318303  5/1989  European Pat. Off. .

OTHER PUBLICATIONS

Patent Abstracts of Japanese Applns. 61-215844 (9/25/86) and 1-134013 (5/26/89).

*Primary Examiner*—E. Rollins Cross
*Assistant Examiner*—Weilun Lo
*Attorney, Agent, or Firm*—Lyon & Lyon

[57] ABSTRACT

In a valve operating system for an internal combustion engine comprising a valve-operation driving force transmission means interposed between a valve operating camshaft and an engine valve carried in a body of the internal combustion engine for opening and closing operation of the engine valve, a valve operation mode changeover mechanism capable of switching the opening and closing mode of the engine valve in accordance with the operating condition of the engine, and a wrapping connector type transmission system provided between the valve operating camshaft and a crankshaft, the valve operating system further includes a tension adjusting means capable of adjusting the tension of a transmitting band of the wrapping connector type transmission system, and a control means for controlling the operation of the tension adjusting means in accordance with the operation mode of the valve operation mode changeover mechanism. It is possible to vary the preset load of the transmitting band in accordance with the operation of the valve operation mode changeover mechanism to vary the peak value of the load applied from the valve operating camshaft to the transmitting band, thereby adjusting the tension of the transmitting band in accordance with the change in operation mode of the engine valve.

1 Claim, 7 Drawing Sheets

VALVE OPERATING SYSTEM FOR INTERNAL COMBUSTION ENGINE

BACKGROUND OF THE INVENTION

1. Field of the Invention

The field of the invention is a valve operating system for an internal combustion engine comprising a valve-operation driving force transmission means interposed between a valve operating camshaft and an engine valve carried in an engine body for opening and closing operation of the engine valve, a valve operation mode changeover mechanism provided in the valve-operation switching the opening and closing mode of the engine valve in accordance with the operating condition of the engine, and a wrapping connector type transmission system provided between the valve operating camshaft and a crankshaft.

2. Description of the Prior Art

Valve operating systems of such type are conventionally known, for example, from Japanese Patent application Laid-open No. 134013/89.

In such a known valve operating system, it is common to operate the valve operation mode changeover mechanism, so that when the engine is in a higher speed operation, the lift amount of the engine valve is larger, and when the engine in a lower speed operation, the lift amount is smaller. In the higher speed operation, the load (shown by a solid line in FIG. 7) applied to a transmitting band when the engine valve is brought into the higher speed operation mode and the load (shown by a broken line in FIG. 7) applied to the transmitting band when the engine valve is brought into the lower speed operation mode each indicate a peak value at substantially the same number $N_p$ of revolutions of engine, e.g., at 4,000 rpm with the same preset load of the transmitting band, as shown in FIG. 7, due to a primary factor that the acting force on and the reaction force from a valve spring biasing the engine valve in a closing direction in the higher speed operation are larger than those in the lower speed operation. Moreover, the peak value is larger in the higher speed operation mode than that in the lower speed operation mode.

In the prior art, the preset load of the transmitting band in the wrapping connector type transmission system is constant and hence, if the switching from the lower speed operation mode to the higher speed operation mode is determined at the above-mentioned number $N_p$ of revolutions of engine or less, the load applied on the transmitting band may be excessively large during operation of the engine valve in the higher speed operation mode. Therefore, in order to avoid the application of an excessive load to the transmitting band, the switching from the lower speed operation mode to the higher speed operation mode must be determined at a number of revolutions of engine larger than the above-mentioned number of revolutions of engine $N_p$, resulting in a reduced freedom of the timing for switching the operation mode of the engine valve.

A relationship between the preset load of the transmitting band and the load applied to the transmitting band is as shown in FIG. 8. When the preset load is lower (when the tension of the transmitting band is reduced), the load is of a peak level on a lower side of the number of revolutions of engine, as shown by a solid line in FIG. 8, whereas when the preset load is higher (when the tension of the transmitting band is increased), the load is of a peak level on a higher side of the number of revolutions of engine, as shown by a dashed line. Moreover, the peak load value in the event of a higher preset load is smaller than that in the event of a lower preset load. It is believed that this is due to a resonance phenomenon of the transmitting band, and the magnitude of the peak load is attributable to the magnitude of the amplitude of a resonance wavelength.

SUMMARY OF THE INVENTION

The present invention has been accomplished with the such circumstances in view, and it is an object of the present invention to provide a valve operating system for an internal combustion engine, wherein the freedom of determination of the timing for switching from the lower speed operation mode to the higher speed operation mode can be increased by utilizing the fact that the peak value of the load of the transmitting band varies as the preset load varies.

To achieve this object, according to the present invention, there is provided a valve operating system for an internal combustion engine, wherein the valve operating system further includes a tension adjusting means capable of adjusting the tension of a transmitting band of the wrapping connection type transmission system, and a control means for controlling the operation of the tension adjusting means in accordance with the operation mode of the valve operation mode changeover mechanism.

With the above contruction, it is possible to control the operation of the tension adjusting means by the control means in accordance with the operation of the valve operation mode changeover mechanism, and it is also possible to vary the present load of the transmitting band to vary the peak value of the load applied from the valve operating camshaft to the transmitting band, thereby ensuring that the tension of the transmitting band can be adjusted in accordance with the change in operaton mode of the engine valve.

The above and other objects, features and advantages of the invention will become apparent from a reading of the following description of the preferred embodiment, taken in conjunction with the accompanying drawings.

BRIEF DESCRIPTION OF THE DRAWINGS

FIGS. 1 to 6 illustrate one embodiment of the present invention, wherein

FIG. 1 is a schematic side view of an internal combustion engine;

FIG. 2 is a longitudinal sectional view of essential portions of a tension adjusting means;

FIG. 3 is a longitudinal sectional view of essential portions of the internal combustion engine for illustrating the construction of a valve operation driving force transmitting means;

FIG. 4 is a sectional view taken along a line IV—IV in FIG. 3;

FIG. 5 is an enlarged sectional view taken along a line V—V in FIG. 3, for illustrating a valve operation mode change-over mechanism;

FIG. 6 is a longitudinal sectional view illustrating the construction of a switchover valve for supplying a lubricant oil into an oil feed passage in a rocker shaft;

DESCRIPTION OF THE PREFERRED EMBODIMENT

Figure 1:
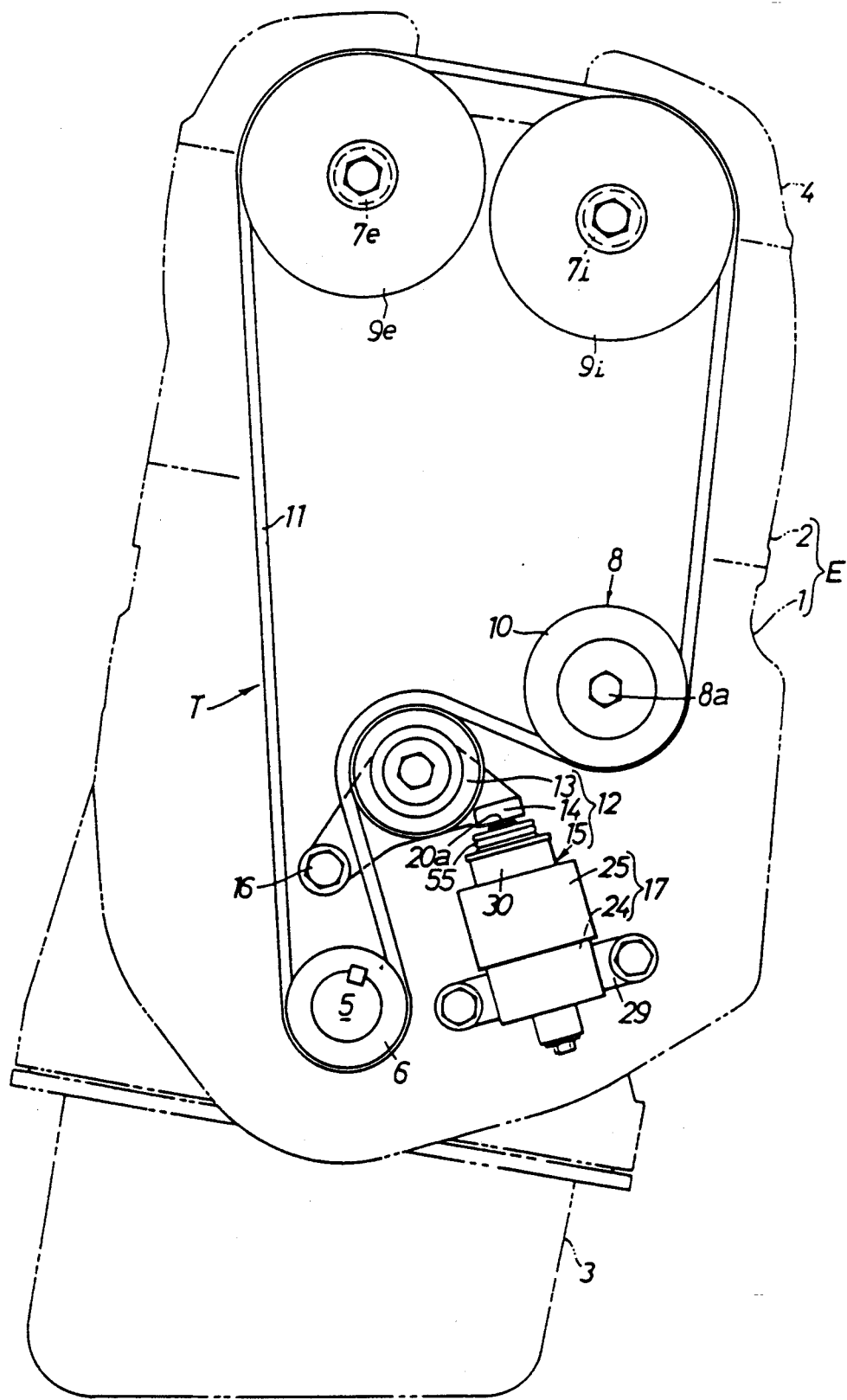

The present invention will now be described with reference to the accompanying drawings by way of one embodiment in which the present invention is applied to a valve operating system for a DOHC multi-cylinder type internal combustion engine. First referring to FIG. 1, a cylinder head 2 is joined to an upper end of a cylinder block 1 and constitutes an engine body E together with the cylinder block 1. An oil pan 3 is jointed to a lower end of the cylinder block 1, and a head cover 4 is joined to a top end of the cylinder head 2.

A driving pulley 6 of a wrapping connector type transmission system T is secured to an end, projecting from the cylinder block 1, of a crankshaft 5 which is rotatably carried by the cylinder block 1 and has a substantially horizontal axis. The wrapping connector type transmission system T is a timing transmission system for driving intake valve side and exhaust valve side valve-operating camshafts 7i and 7e rotatably carried in the cylinder head 2 in parallel to the crankshaft 5 and for driving a water pump 8 mounted on an outer surface of a side-wall of the cylinder block 1 and comprises the driving pulley 6, driven pulleys 9i and 9e secured to the valve operating camshaft 7i and 7e for driving the latter, a driven pulley 10 secured to a pump shaft 8a of the water pump 8 for driving the latter, and an endless timing belt 11 as a transmission band passed around the individual pulleys 9i, 9e and 10.

A tension adjusting means 12 is disposed on the outer surface of the sidewall of the cylinder block 1 and capable of adjusting the tension of the timing belt 11 in the wrapping connector type transmission system T. The tension adjusting means 12 comprises a tension pulley 13 in slide contact with an outer peripheral surface of the timing belt 11 between the driving pulley 6 and the driven pulley 10 for driving the water pump, a tension arm 14 swingably carried on the cylinder block 1 and bearing the tension pulley 13, and an operating portion 15 operatively connected to the tension arm 14 to adjust the swung position of the tension arm 14.

The tension arm 14 is pivotally supported at one end by a support shaft 16 which is fixed to the outer surface of the sidewall of the cylinder block 1 and has an axis parallel to the cranskshaft 5. The tension pulley 13 is carried at an intermediate portion of the tension arm 14 for rotation about an axis parallel to the support shaft 16. The operating portion 15 is operatively connected to the other end of the tension arm 14.

Figure 2:
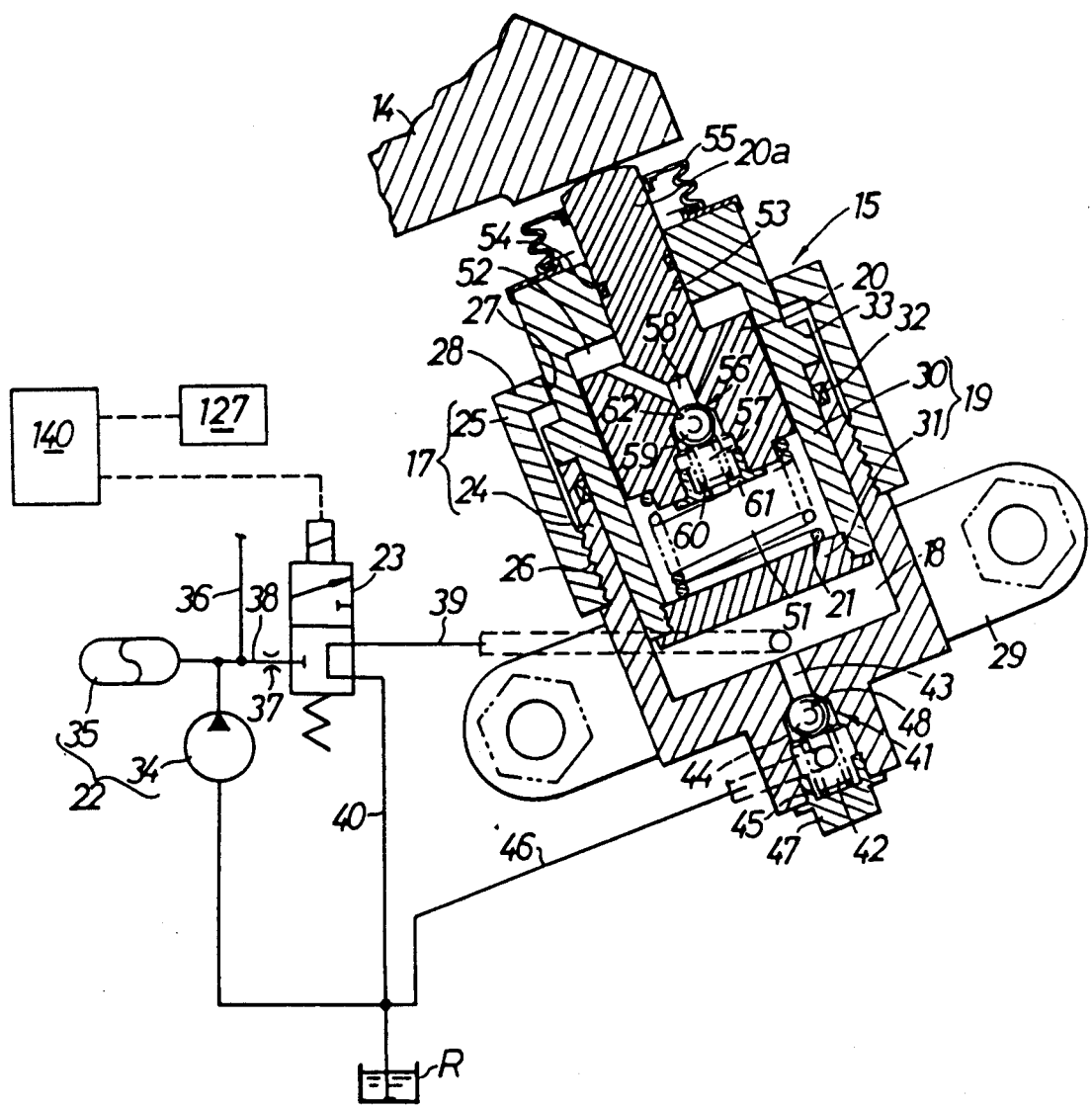

Referring to FIG. 2, the operating portion 15 of the tension adjusting means 12 comprises an outer cylindrically-shaped case 17 closed at its opposite ends and fixed to the outer surface of the sidewall of the cylinder block 1, an inner case fitted in the outer case 17 for axially sliding movement in a limited range to define a hydraulic pressure chamber 18 therebetween, a movable member 20 slidably received in the inner case 19 having an abutment rod portion 20a adapted to abut against the other end of the tension arm 14, a spring 21 interposed between the inner case 19 and the movable member 20 to exhibit a spring force in a direction to bring the abutment rod portion 20a into abutment against the tension arm 14, and a solenoid switchover valve 23 switchable between a state permitting the hydraulic pressure chamber 18 to communicate with a reservoir R and a state permitting the hydraulic pressure chamber 18 to communicate with a hydraulic pressure supply source 22.

The outer case 17 is comprised of a cylindrical bottomed member 24 fixed to the outer surface of the sidewall of the cylinder block 1, and a cylindrical member 25 threadedly fitted at one end over an external threaded portion 26 provided on an outer surface at an opened end of the cylindrical bottomed member 24. The cylindrical member 25 is integrally provided at the other end thereof with a radially inward projecting collar 28 which has a bore 27 defined around its inner peripheral surface and having an inside diameter substantially corresponding to an inside diameter of the bottomed cylindrical member 24. The bottomed cylindrical member 24 is integrally provided with a bracket 29 which is secured to the outer surface of the sidewall of the cylinder block 1. The bottomed cylindrical member 24 is secured to the outer surface of the sidewall of the cylinder block 1 and has an axis perpendicular to the support shaft 16 and an opening disposed at a side closer to the tension arm 14. The cylindrical member 25 is threadedly fitted over the external threaded portion 26 of the bottomed cylindrical member 24 so that the collar 28 may be axially spaced from the opening of the bottomed cylindrical member 24.

The inner case 19 is formed into a cylindrical shape with its opposite ends closed and with the opening of the bottomed cylindrical member 30 being closed by a lid 31 and is slidably received in the bottomed cylindrical member 24 of the outer case 17 with the lid 31 disposed inside. The closed end of the bottomed cylindrical member 30 projects outwardly through the bore 27. The hydraulic pressure chamber 18 is defined between the lid 31 of the inner case 19 and the closed end of the bottomed cylindrical member 24 in the outer case 17. An annular seal member 32 such as an O-ring or the like is fitted in an inner surface of the bottomed cylindrical member 24 at a point closer to the opening in slide contact with the outer surface of the bottomed cylindrical member 30 of the inner case 19.

A radially outwardly projecting regulating collar 33 is integrally provided over the entire periphery on the outer surface at an intermediate portion of the cylindrical bottomed member 30, and disposed between the opening of the bottomed cylindrical member 24 and the collar 28. Thus, the inner case 19 is axially slidable within the outer case 17 in a range in which the regulating collar 33 abuts against the opening of the bottomed cylindrical member 24 and the collar 28. When a hydraullic pressure is applied to the hydraulic pressure chamber 18, the inner case 19 is advanced to a position in which the regulating collar 33 abuts against the collar 28, and when the hydraulic pressure in the hydraulic pressure chamber 18 is released therefrom, the inner case 19 is retreated to a position in which the regulating collar 33 abuts against the opening of the bottomed cylindrical member 24.

The hydraulic pressure supply source 22 comprises a hydraulic pump 34 for pumping an oil from the reservoir R, and an actuator 35 connected to the hydraulic pump 34. An oil passage 36 is connected to the hydraulic pressure supply source 22, and a branch oil passage 38 is diverged from the oil passage 36 and has an orifice 37 provided in the midway thereof. An oil passage 39 leading to the hydraulic pressure chamber 18 is connected to the outer case 17, and a solenoid switchover valve 23 is interposed between the oil passage 39 as well as a release oil passage 40 leading to the reservoir R and the branch oil passage 38.

The solenoid switchover valve 23 is a three-port and two-way switchover valve and is adapted to put the oil passage 39 and the release oil passage 40 into communication with each other in its deexcited condition and to put the branch oil passage 38 and the oil passage 39 into communication with each other in its excited condition.

A relief valve 41 is disposed in the closed end of the bottomed cylindrical member 24 of the outer case 17 and adpated to be opened in response to the hydraulic pressure in the hydraulic pressure chamber 18 becoming equal to or more than a preset value. The relief valve 41 comprises a valve chest 42 provided in the closed end of the bottomed cylindrical member 24 to communicate with an oil passage 46 leading to the reservoir R, a valve bore 43 provided in the closed end of the bottomed cylindrical member 24 and interconnecting the valve chest 42 and the hydraulic pressure chamber 18, a valve sphere 44 contained in the valve chest 42 and capable of closing the valve bore 43, and a spring disposed and contained in the valve chest 42 to bias the valve sphere 44 in a valve-closing direction.

The valve chest 42 having a circular cross-section and closed at its externally opened end by a detachable cap 47 and the valve bore 43 are coaxially made in the bottomed cylindrical member 24, and an end edge of the valve bore 43 opened into the valve chest 42 is formed with a tapered valve seat 48 on which the valve sphere 44 is seatable. The valve sphere 44 is contained in the valve chest 42 so that it can seat on the valve seat 48, and the spring 45 is mounted in compression between the valve sphere 44 and the cap 47.

In such relief valve 41, an oil pressure provided by a hydraulic pressure in the valve bore 43 and thus in the hydraulic pressure chamber 18 is applied to the valve sphere 44 in a direction to move the valve sphere 44 away from the valve seat 48, and a spring force of the spring 45 is applied to the valve sphere 44 to move the latter in a direction to seat on the valve seat 48. Therefore, when a hydraulic pressure equal to or more than a given value determined by a preset load of the spring 45 is applied to the hydraulic pressure chamber 18 and the valve bore 43, the relief valve 41 is opened to put the hydraulic pressure chamber 18 into communication with the reservoir R.

The movable member 20 is formed into a columnar shape and slidably received in the inner case 19 to define a high pressure oil chamber 51 between the inner case 19 and the lid 31 and to define a replenishing oil chamber 52 between the movable member 20 and the closed end of the bottomed cylindrical member 30. Moreover, a smaller diameter rod-like abutment rod portion 20a is projectingly mounted on an end of the movable member 20 closer to the replenishing oil chamber 52. The abutment rod portion 20a extends movably through a guide hole 53 coaxially made in the closed end of the bottomed cylindrical member 30 of the inner case 19 and projects outside to abut against the other end of the tension arm 14. An annular seal member 54 is fitted in an outer surface of the abutment rod portion 20a in slide contact with an inner surface of the guide hole 53, and a boot 55 is mounted between the projecting end of the abutment rod portion 20a and the outer end of the inner case 19.

The spring 21 is mounted in compression within the high pressure oil chamber 51 between the lid 31 of the inner case 19 and the movable member 20, so that the movable member 20 is biased outwardly by the spring force of the spring 21, i.e., in a direction to urge and turn the tension arm 14 by the abutment rod portion 20a in a direction to increase the tension of the timing belt 11 by the tension pulley 13.

A check valve 56 is disposed in the movable member 20 for permitting only a flow of a working oil from the replenishing oil chamber 52 toward the high pressure oil chamber 51. The check valve 56 comprises a valve chest 57 provided in the movable member 20 to communicate with the high pressure oil chamber 51, a valve bore 58 made in the movable member 20 and connecting the valve chest 57 and the replenishing oil chamber 52, a valve sphere 59 contained in the valve chest 57 and capable of closing the valve bore 58, and a spring 60 disposed and contained in the valve chest 57 to bias the valve sphere 59 in a valve-closing direction.

The valve chest 57 is made at a portion of the movable member 21 closer to the high pressure oil chamber 51 with a retainer 61 threadedly engaged in its opened end faced to the high pressure oil chamber 51, and the valve bore 58 is made coaxially with the valve chamber 57. An end edge of the valve bore 58 opened into the valve chest 57 is formed with a tapered valve seat 62 on which the valve sphere 59 is seatable. The valve sphere 59 is contained in the valve chest 57 so that it can seat on the valve seat 62, and the spring 60 is mounted in compression between the valve sphere 59 and the retainer 61.

In such check valve 56, an oil pressure provided by a hydraulic pressure in the valve bore 58 and thus in the replenishing oil chamber 52 is applied to the valve sphere 59 in a direction to move it away from the valve seat 62, and a spring force of the spring 60 and an oil pressure provided by a hydraulic pressure in the valve chest 57 and thus in the high pressure oil chamber 51 are applied to the valve sphere 59 in a direction to move it to seat on the valve seat 62.

In such tension adjusting means 12, the movable member 20 is located in a position in which the tension of the timing belt 11 and an urging force provided for the movable member 20 by the spring force of the spring 21 are balanced. When the tension of the timing belt 11 is decreased from such balanced condition to cause an advancing movement of the movable member 20, the check valve 56 is opened in reponse to an increase in hydraulic pressure in the replenishing oil chamber 52 and a reduction in hydraulic pressure in the high pressure oil chamber 51, thereby permitting the oil to flow out of the replenishing oil chamber 52 into the high pressure oil chamber 51, so that the movable member 20 is smoothly moved. When the movable member is urged in a retreating direction by the action of an increased tension of the timing belt 11, the check valve 56 remains closed, so that a flow of the oil out of the high pressure oil chamber 51 into the replenishing oil chamber 52 is permitted only through a clearance between the outer surface of the movable member 20 and the inner surface of the inner case 19, thereby maintaining the hydraulic pressure in the high pressure oil chamber 51. Therefore, the movable member 20 maintains its current position with an effort under an influence of the hydraulic pressure in the high pressure oil chamber 51. When the hydraulic pressure chamber 18 is placed into communication with the reservoir R by the operation of the solenoid switchover valve 23, the inner case 19 is retreated to a position in which the regulating collar 33 thereof abuts against the opening of the cylindrical bottomed member 24 of the outer case 17. When the hydraulic pressure chamber 18 is placed into communication with the hydraulic pressure supply source 22 by the operation of the solenoid switchover valve 23, the inner case 19 is advanced until the regulating collar 33 thereof abuts against the collar 28 of the outer case 17. Therefore, when the hydraulic pressure chamber 18 is placed into communication with the hydraulic pressure supply source 22 by means of the solenoid switchover valve 23, the spring force of the spring 21 is increased and the tension of the timing belt 11 is increased, as compared with the condition in which the hydraulic pressure chamber 18 has been placed into communication with the reservoir R.

Description will now be made of a construction for transmitting powers from the intake valve side and exhaust valve side valve-operating camshafts 7i and 7e to intake valves Vi and exhaust valves Ve as engine valves.

Figure 3:
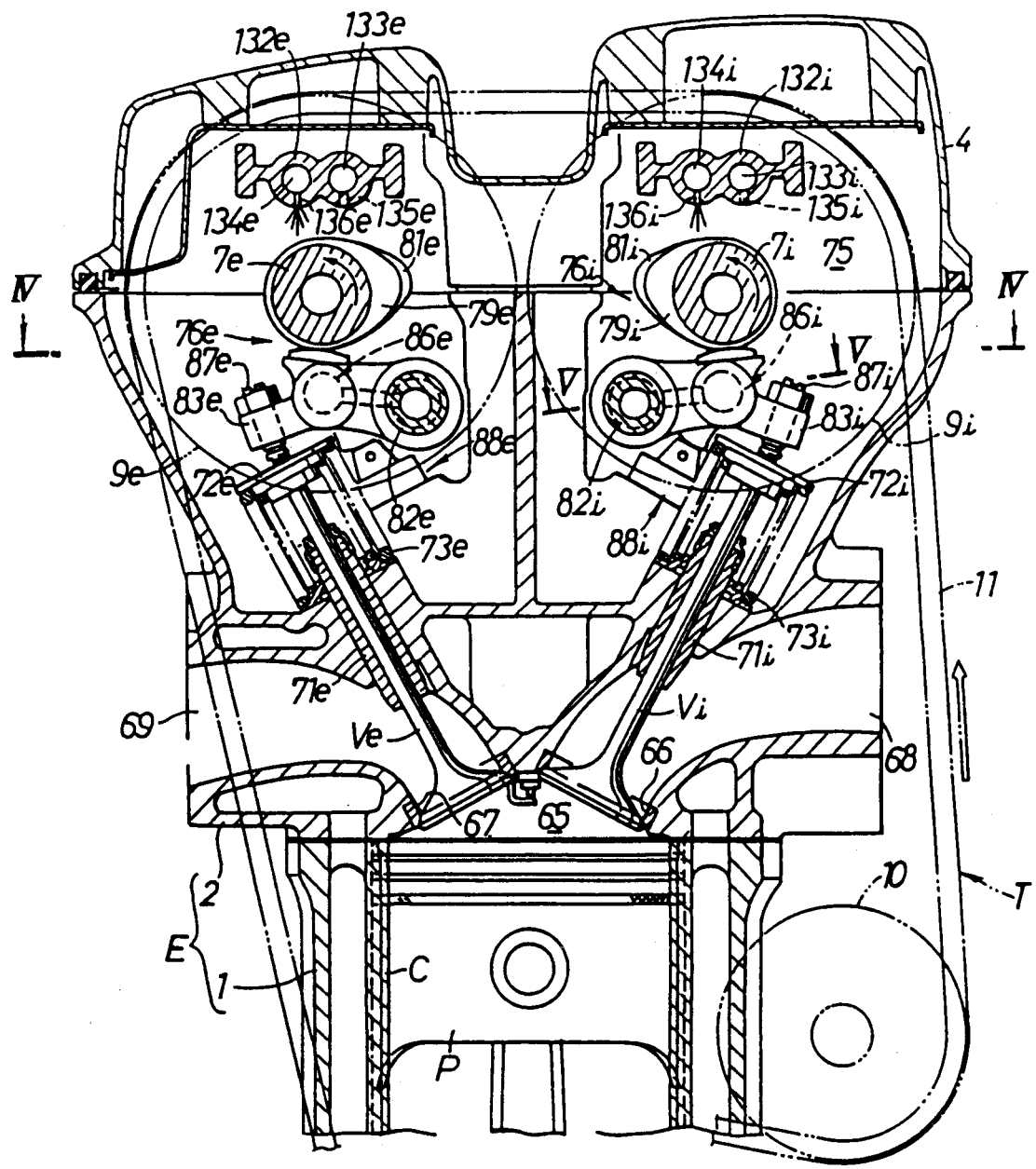
Figure 4:
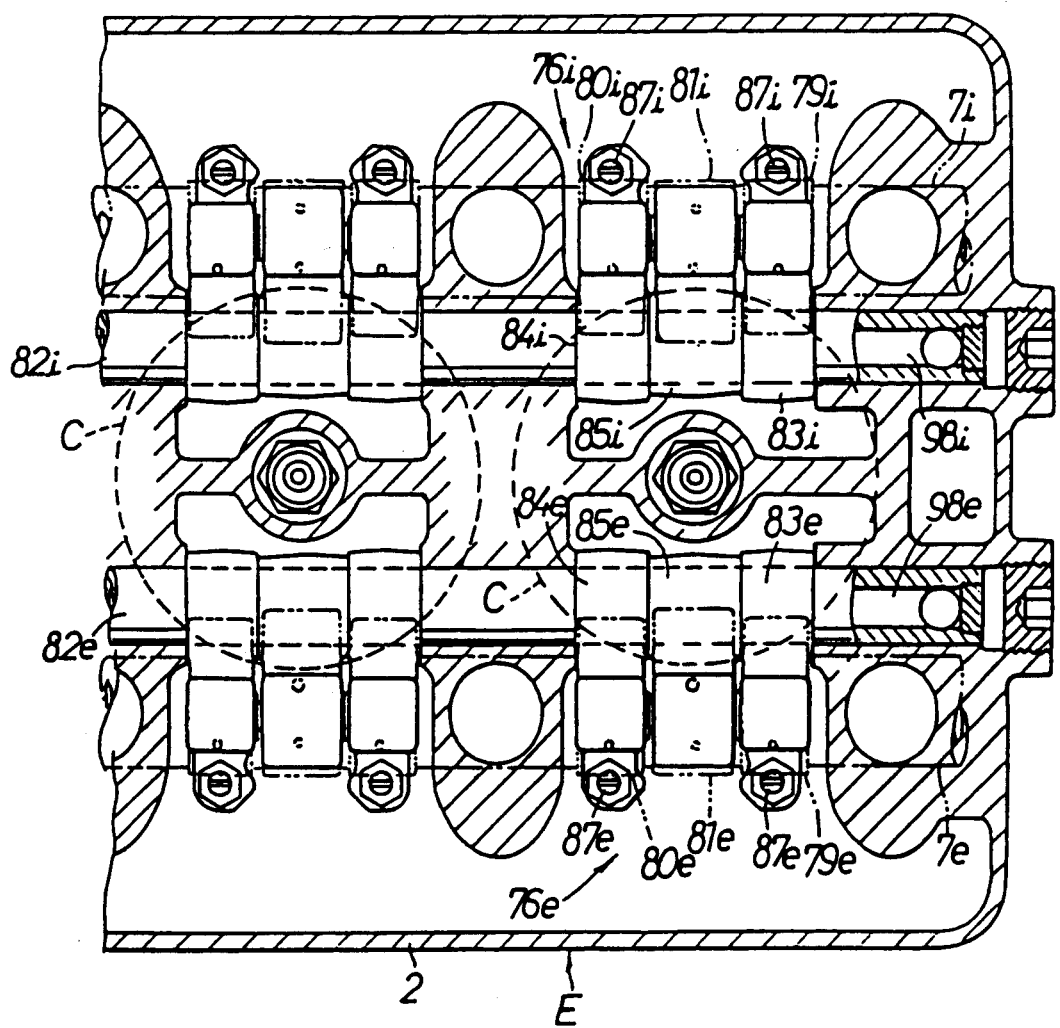

Referring to FIGS. 3 and 4, a plurality of, e.g., four cylinders C are provided in a series arrangement in the cylinder block 1, and a combustion chamber 65 is defined between the cylinder head 2 and a piston P which is slidably received in each of the cylinders C. At a portion forming a ceiling surface of each combustion chamber 65, the cylinder head 2 is provided with a pair of intake valve openings 66 and a pair of exhaust valve openings 67. Each of the intake valve openings 66 is connected to an intake port 68 opened in one side surface of the cylinder head, and each of the exhaust valve openings 67 is connected to an exhaust port 69 opened in a side surface of the cylinder head 2.

Cylindrical guides 71i and 71e are fixedly fitted in the cylinder head 2 at its position corresponding each cylinder C to guide a pair of intake valves Vi as engine valves capable of opening and closing the associated intake valve openings 66 and a pair of exhaust valves Ve as engine valves capable of opening and closing the associated exhaust valve openings 67. Valve springs 73i and 73e are mounted in compression between the cylinder head 2 and collars 72i and 72e provided on those upper ends of the intake and exhaust valves Vi and Ve which project upwardly from the cylindrical guides 71i and 71e, respectively, so that the intake and exhaust valves Vi and Ve are biased upwardly, i.e., in valve-closing directions by the valve springs 73i and 73e, respectively.

A working chamber 75 is defined between the cylinder head 2 and the head cover 4. Disposed and contained in the working chamber 75 are an intake valve side valve-operation driving-force transmitting means 76i for transmitting a driving force from the intake valve side valve-operating camshaft 7i to the intake valves Vi for each cylinder C, and an exhaust valve side valve-operation driving-force transmitting means 76e for transmitting a driving force from the exhaust valve side valve-operating camshaft 7e to the exhaust valves Ve for each cylindser C. The both valve-operation driving force transmitting means have basically the same construction and hence, the intake valve side valve-operation driving-force transmitting means 76i will be described below with suffix i attached to reference numerals for its associated components, and the exhaust valve side valve-operation driving-force transmitting means 76e will be only illustrated with suffix e attached to reference numerals for its associated components.

The intake valve side valve-operation driving-force transmitting means 76i comprises lower speed cams 79i and 80i and a higher speed cam 81i provided on the intake valve side valve-operating camshaft 7i in correspondence with each cylinder C, a rocker shaft 82i fixedly disposed in the cylinder head 2 in parallel to the valve-operating camshaft 7i, a first driving rocker arm 83i pivotally mounted on the the rocker shaft 82i in correspondence to each cylinder C, a second driving rocker arm 84i, and a free rocker arm 85i.

The intake valve side valve-operating camshaft 7i is disposed above the cylinder head 2 in parallel to a direction of arrangement of the cylinders C for rotation about an axis. The lower speed cams 79i and 80i are integral with the intake valve side valve-operating camshaft 7i at locations corresponding to the intake valves Vi, and the higher speed cam 81i is also integral with the intake valve side valve-operating camshaft 7i between the lower speed cams 79i and 80i. On the other hand, the rocker shaft 82i is fixedly held by the cylinder head 2 below the intake valve side valve-operating camshaft 7i and has an axis parallel to the latter. The first driving rocker arm 83i operatively connected to one of the intake valves Vi, the second driving rocker arm 84i and the free rocker arm 85i disposed between the first and second driving rocker arms 83i and 84i are pivotally carried on the rocke shaft 82i adjacent one another.

Tappet screws 87i are threadedly fitted in the first and second driving rocker arm 83i and 84i for advancing and retreating movements, respectively and abut against top ends of the corresponding intake valves Vi, whereby the driving rocker arms 83i and 84i are operatively connected to the intake valves Vi, respectively.

The free rocker arm 85i is resiliently biased into slide contact with the higher speed cam 81i by a lost motion mechanism 88i interposed between the free rocker arm 85i and the cylinder head 2.

Figure 5:
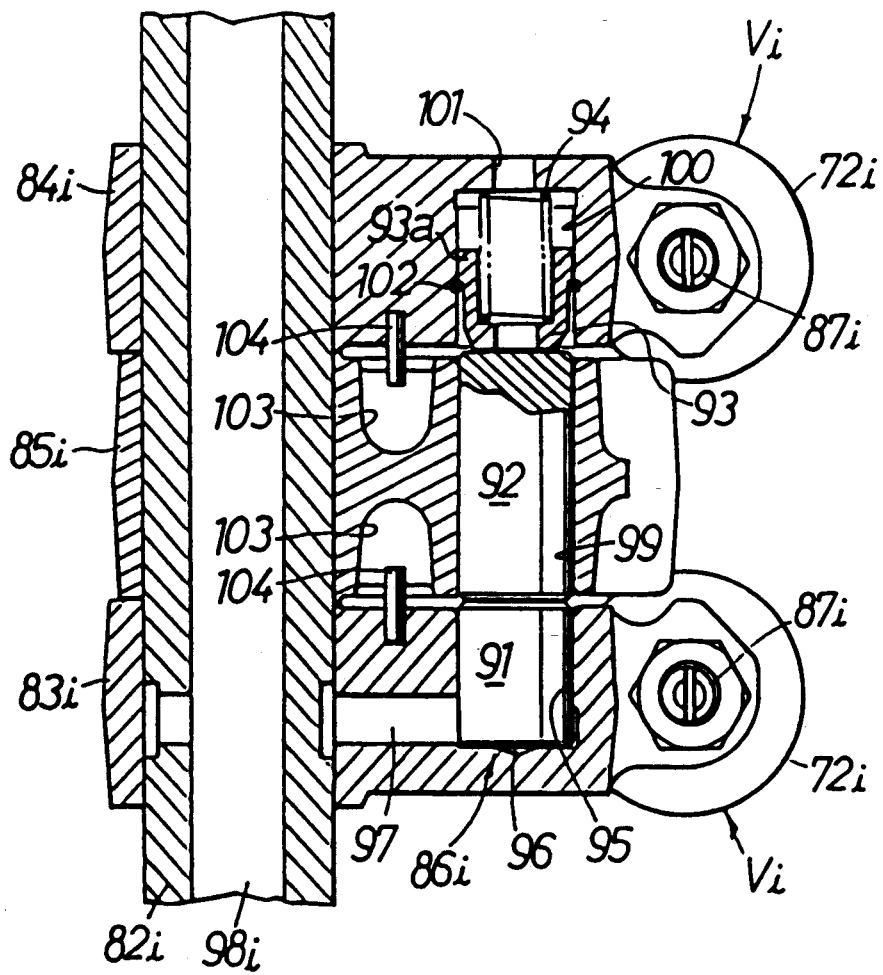

Referring also to FIG. 5, a valve-operation mode change-over mechanism 86i is provided between the rocker arms 83i, 84i and 85i. The valve-operation mode changeover mechanism 86i comprises a first switchover pin 91 capable of interconnecting the first driving rocker arm 83i and the free rocker arm 86i, a second switchover pin 92 capable of interconnecting the free rocker arm 85i and the second driving rocker arm 84i, a regulating pin 93 for regulating the movement of the first and second switchover pins 91 and 92, and a return spring 94 for biasing the pins 91 to 93 in disconnecting directions.

The first driving rocker arm 83i has a first bottomed guide hole 95 made therein in parallel to the rocker shaft 82i and opened toward the free rocker arm 85i, and the first columnarly shaped switchover pin 91 is slidably received in the first guide hole 95. A hydraulic pressure chamber 96 is defined between one end of the first switchover pin 91 and a closed end of the first guide hole 95. The first driving rocker arm 83i is also provided with a passage 97 communicating with the hydraulic pressure chamber 96, and the rocker shaft 82i is provided with an oil feed passage 98i which normally communicates with the hydraulic pressure chamber 96 through the passage 97 irrespective of the swung state of the first driving rocker arm 83i.

The free rocker arm 85i has a guide hole 99 corresponding to the first guide hole 95 and made therein in parallel to the rocker shaft 82i to extend between its opposite side surfaces, and the second switchover pin 92 is slidably received in the guide pin 99 with one end abutting against the other end of the first switchover pin 91. Moreover, the second switchover pin 92 is also columnarly shaped.

The second driving rocker arm 84i has a second bottomed guide hole 100 made therein in parallel to the rocker shaft 82i and opened toward the free rocker arm 85i, and the bottomed cylindrical restraining pin 93 abutting against the other end of the second switchover pin 92 is slidably received in the second guide hole 100. The regulating pin 93 is disposed with its opened end directed toward a closed end of the second guide hole 100, and a collar 93a projects radially outwardly at the opened end in slide contact with the second guide hole 100. The return spring 94 is mounted in a compressed manner between the closed end of the second guide hole 100 and the closed end of the regulating pin 93, so that the pins 91, 92 and 93 abutting against one another are biased toward the hydraulic pressure chamber 96 by a spring force of the return spring 94. Moreover, the second guide hole 100 is provided at its closed end with a release hole 101 for venting air and the oil.

A retaining ring 102 is fitted in an inner surface of the second guide hole 100 and capable of engaging the collar 93a of the regulating pin 93 to prevent the regulating pin 93 from slipping out of the second guide hole 100. The position of retaining ring 102 fitted is set such that the regulating pin 93 is prevented from further moving toward the free rocker arm 85i from a state in which it is in abutment against the second switchover pin 92 at a location correspoding to between the free rocker arm 85i and the second driving rocker arm 84i.

In such valve-operation mode changeover mechanism 86i, incresing of the hydraulic pressure in the hydraulic pressure chamber 96 causes the first switchover pin 91 to be fitted into the guide hole 99, while causing the second switchover pin 92 to be fitted into the second guide hole 100, thereby connecting the rocker arm 83i, 85i and 84i together. Decreasing of the hydraulic pressure in the hydraulic pressure chamber 96 causes the spring force of the return spring 94 to return the first switchover pin 91 to a position in which its surface abutting against the second switchover pin 92 corresponds to between the first driving arm 83i and the free rocker arm 85i and to return the second switchover pin 92 to the position in which its surface abutting against the restraining pin 93 corresponds between the first driving rocker arm 83i and the free rocker arm 85i, so that the connection of the rocker arms 83i, 85i and 84i is released.

The free rocker arm 85 has recesses 103 provided in its side surfaces corresponding to the first and second driving rocker arms 83i and 84i by an elimination of a wall for a reduction in weight, and a spring pin 104 is press-fitted into a side surface of each of the first and second driving rocker arm 83i and 84i corresponding to the recess 103 and extends into the recess 103. The amount of relatively swinging movement of the free rocker arm 85i and the first and second driving rocker arms 83i and 84i is regulated by the recesses 103 and the spring pins 104, but the first and second driving rocker arms 83i and 84i in slide contact with the lower speed cams 79i and 80i and the free rocker arm 85i in slide contact with the higher speed cam 81i swing relative to each other during a lower speed operation of the engine. The recesses 103 are formed to such an extent that such relatively swinging movement will not be obstructed. Moreover, the recesses 103 and spring pins 104 serve to inhibit the rocker arms 83i, 84i and 85i from being relatively swung in an unlimited range and to prevent the first and second switchover pins 91 and 92 from being fallen off and so on.

Figure 6:
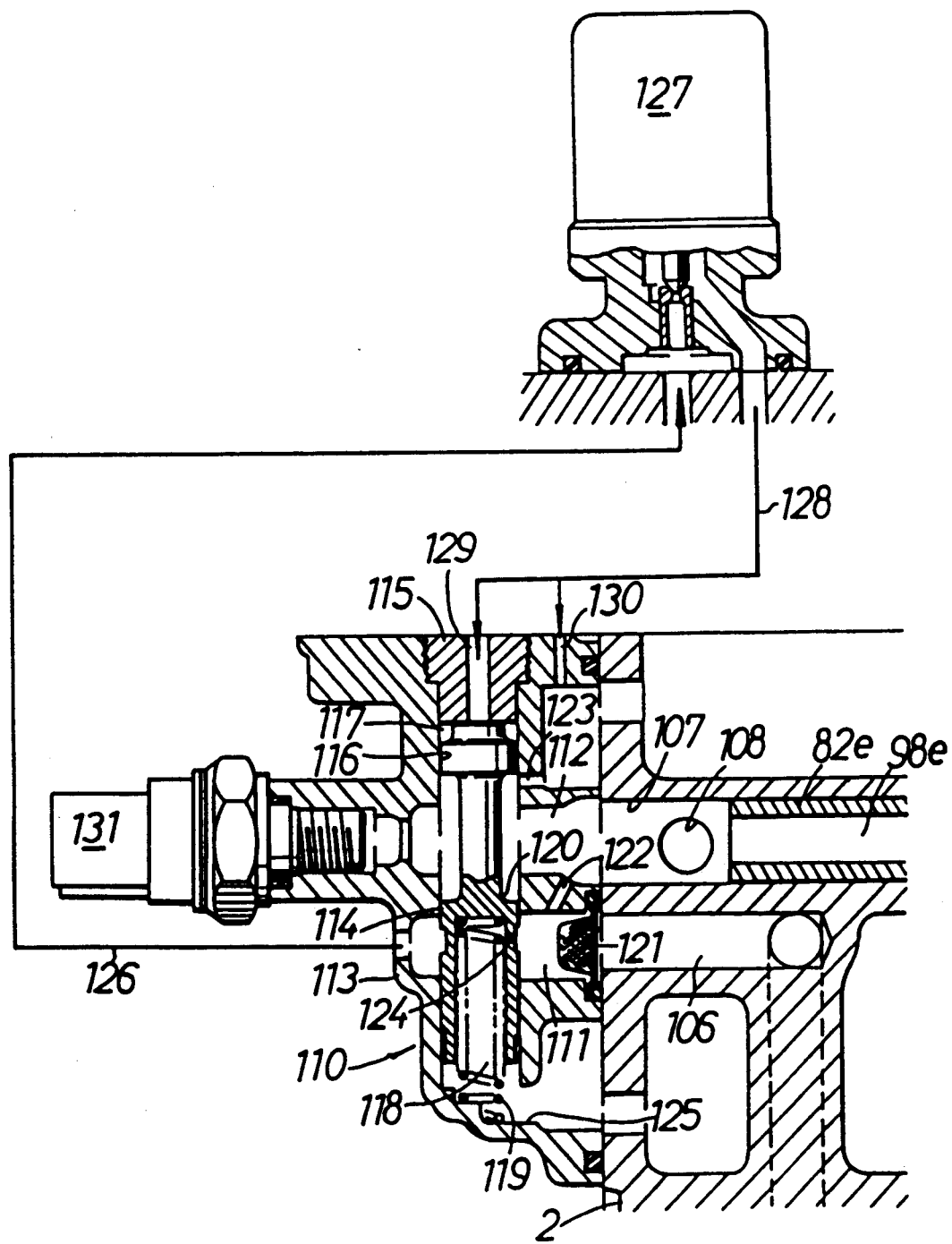
Figure 7:
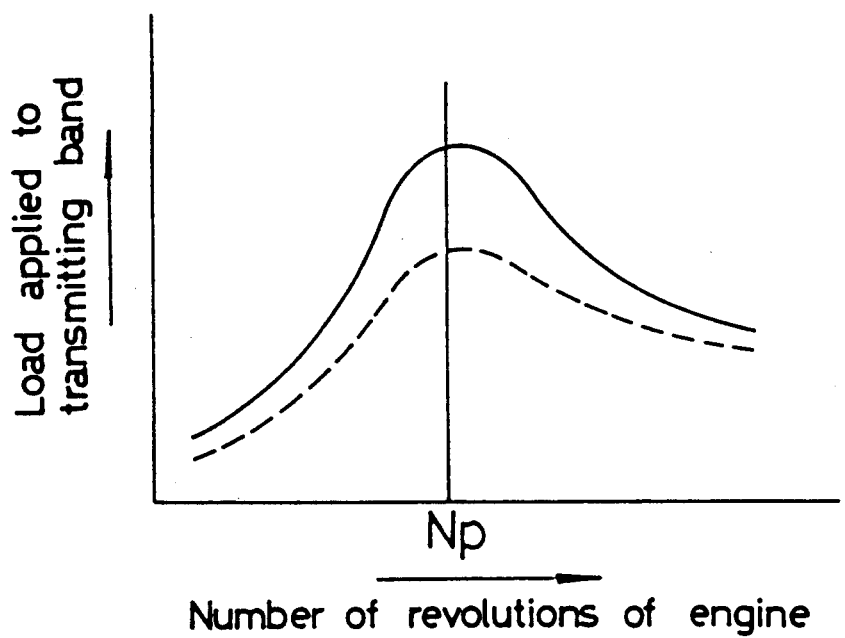
FIG. 7 is a graph illustrating a relationship between the number of revolutions of engine and the load on a transmitting band in accordance with the change in valve operation mode.

Referring to FIG. 6, an oil passage 106 communicating with the oil passage 36 is provided in the cylinder head 2 at a location nearer to its side surface opposite from the above-described wrapping connector type transmission system T in the direction of arrangement of the cylinders C and opened into such side surface of the cylinder head 2.

The cylinder head 2 has an oil feed port 107 which is made therein at its portion supporting one of the rocker shafts 82i and 82e, i.e., one end of the rocker shaft 82e for the exhaust valve Ve to lead to the oil feed passage 98e in the rocker shaft 82e and which is opened into one end face of the cylinder head 2. The cylinder heas 2 also has a communication passage 108 made therein and permitting the oil feed port 107 to communicate with the oil feed passage 98i in the rocker shaft 82i for the intake valve Vi.

A switchover valve 110 is mounted in the side surface of the cylinder head 2 to switchover the connection and disconnection between the opening of the oil passage 106 into the side surface of the cylinder head 2 and the oil feed port 107. The switchover valve 110 comprises a valve spool 114 slidably fitted in a housing 113 mounted on the side surface of the cylinder head 2 for movement between a lower hydraulic pressure supply position (upper position) in which a lower hydraulic pressure is supplied to the oil feed port 107 and a higher hydraulic pressure supply position (lower position) in which a higher hydraulic pressure is supplied to the oil feed port 107, the housing 113 having an inlet port 111 leading to the oil passage 106 and an outlet port 112 leading to the oil feed port 107.

A cylinder bore 116 is made in the housing 113 and closed at its upper end by a cap 115, and the valve spool 114 is slidably fitted in the cylinder bore 116 to define a working oil pressure chamber 117 between the spool and the cap 115. Furthermore, a spring 119 is contained in a spring chamber 118 defined between a lower portion of the housing 113 and the valve spool 114 for biasing the valve spool 114 upwardly. Thus, the valve spool 114 is biased upwardly, i.e., toward the lower hydraulic pressure supply position, and when the higher hydraulic pressure is supplied to the working oil pressure chamber 117, the valve spool 114 is moved to the higher hydraulic pressure supply position by an oil pressure in the working oil pressure chamber 117. The valve spool 114 is provided with an annular recess 120 capable of permitting communication between the inlet port 111 and the outlet port 112. When the valve spool 114 has been moved upwardly as shown in FIG. 6, it is in a state to cut off the communication between the inlet and outlet ports 111 and 112.

With the housing 113 mounted on the side surface of the cylinder head 2, an oil filter 121 is clamped between the inlet port 111 and the oil passage 106. The housing 113 is also provided with an orifice hole 122 permitting the communication between the inlet and outlet ports 111 and 112. Therefore, even if the valve spool 114 is in a closing position, the inlet and outlet ports 111 and 112 are in communication with each other through the orifice hole 122, so that a hydraulic pressure restricted by the orifice hole 122 is supplied from the outlet port 112 to the oil feed port 107.

The housing 113 is also provided with a by-pass port 123 which communicates with an upper portion of the cylinder head 2 and which is adapted to be connected to the outlet port 112 through the annular recess 120 only when the valve spool 114 is in its closed position. Further, the valve spool 114 has an orifice hole 124 provided therein and permitting the inlet port 111 to communicate with the spring chamber 118 irrespective of the position of the valve spool 114. Moreover, a through hole 125 is made in a lower portion of the housing 113 and permits the spring chamber 118 to communicate with the inside of the cylinder head 2, so that the oil flowing through the orifice hole 124 into the spring chamber 118 is returned via the through hole 125 into the cylinder head 2. This causes any dusts and dirts deposited on the spring 119 to be taken away therefrom by the flow of the oil, thus avoiding any adverse affection of the dusts and dirts on the expanding and contracting operations of the spring.

A line 126 normally communicates with the inlet port 111 and is connected to the housing 113 and also to a line 128 through a solenoid on-off valve 127. In turn, the line 128 is connected to a connection hole 129 made in the cap 115.

The housing 113 is also provided with a leak jet 130 which communicates with the line 128 and leads to the upper portion of the cylinder head 2.

A pressure detector 131 is attached to the housing 113 for detecting the hydraulic pressure in the outlet port 112 and thus in the oil feed passages 98i and 98e and serves to detect whether or not the switchover valve 110 is normally operative.

Referring again to FIG. 3, a passage defining member 132i is disposed above the intake valve side valve-operating camshaft 7i to extend in parallel to the camshaft 7i and has a higher speed lubricant passage 133i and a lower speed lubricant passage 134i made therein in parallel to each other. Thus, a lubricant oil supplied from the oil feed passage 98i through a restriction, not shown, to the higher speed lubricant passage 133i, when the intake valve Vi is its higher speed opperation mode, and the lubricant oil from the hydraulic pressure supply source 22 is normally supplied through a restriction, not shown, to the lower speed lubricant passage 134i. A lower portion of the passage defining member 132i has an ejecting hole 135i made therein at a location corresponding to the higher speed cam 81i and leading to the higher speed lubricant passage 133i, and an ejecting hole 136i made therein at a location corresponding to the lower speed cams 79i and 80i and the higher speed cam 81i and leading to the lower speed lubricant passage 134i, so that slide contact portions of the cams 79i, 80i and 81i and the rocker arms 83i, 84i and 85i are lubricated by the lubricant oil ejected from the ejecting holes 135i and 136i.

Referring again FIG. 2, the switchover operation of the solenoid switchover valve 23 in the tension adjusting means 12 is controlled by a control means 140 which is arranged to control the switchover operation of the solenoid switchover valve 23 synchronously with controlling of the opening and closing of the solenoid on-off valve 127 which administers the swiching-over of the switchover valve 110. More specifically, the control means 140 serves to excite the solenoid switchover valve 23 to increase the tension of the timing belt, when a higher hydraulic pressure is applied to the hydraulic pressure chambers 96 in the valve operation mode changeover mechanisms 86i and 86e to bring the intake and exhaust valves Vi and Ve into the higher speed operation mode, and to deexcite the solenoid switchover valve 23 to reduce the tension of the timing belt 111, when the hydraulic pressure in the hydraulic pressure chambers 96 in the valve operation mode changeover mechanisms 86i and 86e is released to bring the intake and exhaust valves Vi and Ve into the lower speed operation mode.

The operation of the present embodiment will be described below. When the valve operation mode changeover mechanisms 86i and 86e are operated to bring the intake and exhaust valves Vi and Ve into the higher speed operation mode, the solenoid on-off valve 127 is opened. This causes a higher pressure oil to be supplied to the working oil pressure chamber 117, so that the valve spool 114 is operated by a hydraulic pressure provided by the oil in the working oil pressure chamber 117 to open the valve, thereby permitting the hydraulic pressure to be supplied to the oil feed passages 98i and 98e in such a manner that the higher hydraulic pressure is applied to the hydraulic pressure chamber 96. This causes the valve operation mode changeover mechanisms 86i and 86e to be operated for connection, thereby ensuring that the intake and exhaust valves Vi and Ve can be opened and closed in the higher speed operation mode.

Figure 8:
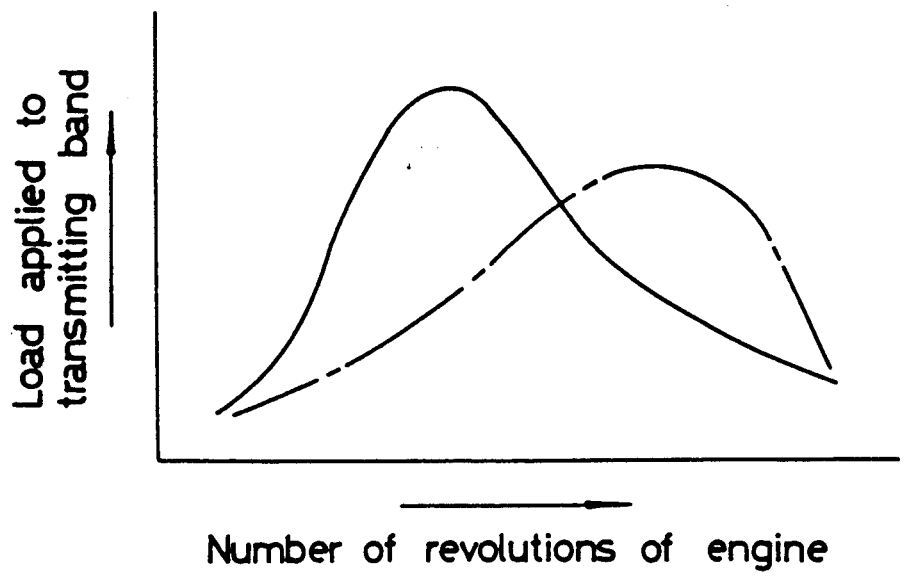
FIG. 8 is a graph illustrating a relationship between the number of revolutions of engine and the load on the transmitting band in accordance with the preset load of the transmitting band.

In this higher speed operation mode, the tension adjusting means 12 increases the tension of the timing belt 11 to increase the preset load. If the preset load is increased in this manner, the peak value of the load applied from the valve operating camshafts 7i and 7e to the timing belt 11 indicates a relatively low value at the side of the number of higher speed rotations of the engine, as shown in by a dashed line in FIG. 8. Therefore, in spite of relative increasing of the load applied to the timing belt 11 due to the higher speed operation mode of the intake and exhaust valves Vi and Ve, it is possible to relatively reduce the peak value of the load on the timing belt, and it is also possible to avoid that any overload is applied to the timing belt 11. Accordingly, it is possible to increase the freedom of determination of the timing for swiching-over from the lower speed operation mode to the higher speed operation mode and to increase the freedom of setting of the cam profiles of the higher speed cams 81i and 81e.

When the opening and closing mode of the intake and exhaust valves Vi and Ve is switched over from the higher speed operation mode to the lower speed operation mode, the solenoid on-off valve 127 is closed. Upon closing of the solenoid on-off valve 127, the hydraulic pressure in the line 128 is escaped from the leak jet 130, so that the hydraulic pressure in the working oil pressure chamber 117 is released promptly, and the switchover valve 110 is closed in response thereto. Moreover, when the switchover valve 110 has been closed, the hydraulic pressure in the oil feed passages 98i and 98e is escaped into the cylinder head 2 by way of the by-pass port 122, so that the hydraulic pressure in the oil feed passages 98i and 98e, i.e., in the valve operation mode changeover mechanisms 86i and 86e is reduced promptly into a lower level. This leads to an improved responsibility of swiching-over from the higher speed operation mode to the lower speed operation mode.

Moreover, during an operation in the lower speed operation mode, the tension adjusting means 12 decreases the tension of the timing belt 11 reduces the preset load, thereby esuring that any noises can be prevented from being generated by the timing belt during a lower speed operation.

What is claimed is:

1. A valve operating system for an internal combustion engine comprising a valve-operation driving force transmission means interposed between a valve operating camshaft and an engine valve carried in an engine body for opening and closing operation of the engine valve, a valve operation mode changeover mechanism provided in said valve-operation driving force transmission means and capable of switching the opening and closing mode of the engine valve in accordance with the operating condition of the engine, and a wrapping connector type transmission system provided between said valve operating camshaft and a crankshaft, wherein said valve operating system further includes a tension adjusting means capable of adjusting the tension of a transmitting band of the wrapping connector type transmission system, and a control means for controlling the operation of said tension adjusting means in accordance with the operation mode of said valve operation mode changeover mechanism.

* * * * *